United States Patent [19]

Uee et al.

[11] Patent Number: 4,779,129
[45] Date of Patent: Oct. 18, 1988

[54] FM SIMULTANEOUS BROADCAST SYSTEM FOR CATV

[75] Inventors: Nobuo Uee; Toru Kawakubo, both of Tokyo, Japan

[73] Assignee: Pioneer Electronic Corporation, Tokyo, Japan

[21] Appl. No.: 901,667

[22] Filed: Aug. 29, 1986

[30] Foreign Application Priority Data

Aug. 29, 1985 [JP] Japan .................. 60-190571

[51] Int. Cl.[4] .................. H04N 7/10; H04N 7/06
[52] U.S. Cl. .................. 358/86; 358/189; 455/4
[58] Field of Search .......... 358/86, 144, 189, 198, 358/349; 380/19; 381/2; 455/3, 4, 6

[56] References Cited

U.S. PATENT DOCUMENTS 3,639,686  2/1972  Walker et al. .............. 455/4 X
4,630,108 12/1986  Gomersall .................. 455/4 X
4,698,670 10/1987  Matty ........................ 358/86

FOREIGN PATENT DOCUMENTS 55-46657  4/1980  Japan .................. 358/198
57-45712  3/1982  Japan .................. 358/189

OTHER PUBLICATIONS

Thomas C. Matty, "User Friendly Cable Stereo Module", 1985 NCTA Technical Papers, (published by National Cable Television Association), pp. 134–139.

Primary Examiner—Keith E. George
Attorney, Agent, or Firm—Sughrue, Mion, Zinn, Macpeak & Seas

[57] ABSTRACT

A CATV signal in which a channel allocation for an FM stereo channel is superimposed on the TV audio signal. At the receiving end, the channel allocation is demodulated from the TV audio signal and is used to tune the FM tuner to the allocated channel.

4 Claims, 4 Drawing Sheets $f_H$: HORIZONTAL SYNCHRONIZING FREQ.

FIG. 6A
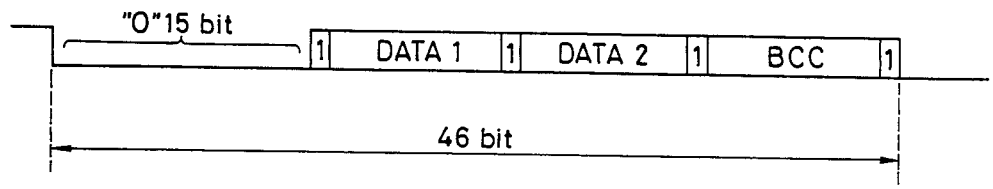
BCC : BLOCK CHECK CODE
FIG. 6B
DATA 1
| O/E | 0 | 0 | 0 | 0 | 0 | 0 | 0 | P |
O/E $\begin{cases} 1: \text{BASE FREQ.} = 87.5 \text{ MHz} \\ 0: \text{BASE FREQ.} = 87.6 \text{ MHz} \end{cases}$
P: PARITY
FIG. 6C
DATA 2
| 0 | 0 | 0 | 1 | 0 | 0 | 0 | 0 | P |
FIG. 7
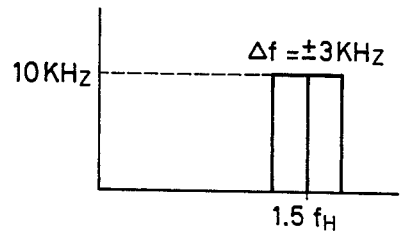

FM SIMULTANEOUS BROADCAST SYSTEM FOR CATV

BACKGROUND OF THE INVENTION

1. Field of the Invention

This invention relates to a CATV (cable television) system for delivering an FM stereo broadcast using frequency bands other than video broadcast frequency bands.

2. Background Art

When a stereo broadcast is delivered over a CATV system, ordinary FM broadcast receivers in households may be utilized to receive the stereo broadcast.

By this is meant that an audio stereo broadcast is transmitted using a wide frequency band ranging from 87.5 MHz to 120.0 MHz. In this case, television receivers for receiving images and FM tuners for receiving sound are provided in the subscribing households.

FIG. 1 shows a transmitter of the sort at the CATV center. In FIG. 1, there is shown an arrangement of a video/audio source 1, a TV/IF modulator 2, an IF scramble encoder 3 and a channel up converter 4 for converting the output into each channel frequency.

On the other hand, stereo sound for stereo broadcasting is supplied to a amplifier 7 through a stereo encoder 5 and an FM audio signal modulator 6. Subsequently, the images, monaural and stereo sounds are synthesized before being transmitted together with other channel signals.

FIG. 2 shows a receiver for receiving a stereo broadcast of this sort. The signal transmitted from the CATV center is supplied through a signal divider to a converter 14 and decoded by a scramble decoder 15 according to the data from a controller 16, the decoded signal being applied to a TV set 9.

On the other hand, the audio signal divided by the divider 35 and the outputs thereof are supplied by an FM stereo tuner 10 to speakers 12 and 13 through an audio amplifier 11.

In the FM stereo reception with the conventional CATV system, the video/audio source 1 is modulated by the TV/IF modulator 2 and supplied to the IF scramble encoder 3 as an IF video signal and an IF audio signal. The IF video signal is scrambled, whereas the IF audio signal is subjected to amplitude modulation and a descramble data code is superimposed thereon. This signal is frequency converted to a channel H by the channel up converter 4.

Apart from this, the audio stereo signal produced by the video/audio source 1 for stereo broadcasting is applied to the stereo encoder 5 and, after being subjected to frequency modulation in the FM audio signal modulator 6, is set by the multiple amplifier 7 to a frequency of, e.g., 84 MHz, for FM broadcasting.

The output signal thus produced is synthesized with the output signal of the above channel up converter 4 and transmitted together with other channel signals.

On the terminal side, a signal from a trunk line is divided by the divider 35 into those in the TV frequency band and those in the FM broadcast frequency band. The TV frequencies are supplied to a CATV terminal unit 8, whereas the FM frequencies are applied to an audio system consisting of the FM stereo tuner 10, the audio amplifier 11 and the speakers 12 and 13. When a viewer operates the terminal unit 8 with the intention of selecting the channel H (one of the stereo channels), the converter 14 tunes into the channel H under instructions from the controller 16 and the signal is supplied to the scramble decoder 15. Since the audio signal has been superimposed on the scramble decode data, the controller 16 provides the decode data according to the data demodulated from the audio signal, causing the descrambled TV signal to be produced and applied to the TV set 9. At this time, the viewer is expected to hear a monaural sound through the TV set 9.

Since the audio stereo signal on the FM broadcast band is transmitted by the CATV center, the view, if desirous of receiving the FM broadcast, manually operates the FM stereo tuner 10 located apart from the TV set 9, tunes in to 84 MHz corresponding to the channel H to receive FM stereo service by means of the FM stereo tuner.

As the conventional CATV stereo broadcasting is thus implemented, the viewer must mutually operate the FM stereo tuner with the TV set and is inconvenienced by operating the tuner whenever switching the TV channel.

SUMMARY OF THE INVENTION

The present invention is intended to eliminate the above shortcomings and it is therefore an object of the invention to provide an FM broadcast receiver capable of receiving FM stereo broadcast service. Data in an FM broadcast frequency band for supplying a stereo sound is superimposed on an IF audio signal transmitted together with a video signal to allow an FM stereo receiver on the terminal side to automatically respond to the FM stereo broadcast service according to the above frequency data.

BRIEF DESCRIPTION OF THE DRAWINGS

FIGS. 6A, 6B and 6C are examples of channel data by NRZ.

FIG. 7 is a base band spectrum of data after the detection of data on the terminal side.

DETAILED DESCRIPTION OF THE PREFERRED EMBODIMENTS

Figure 1:
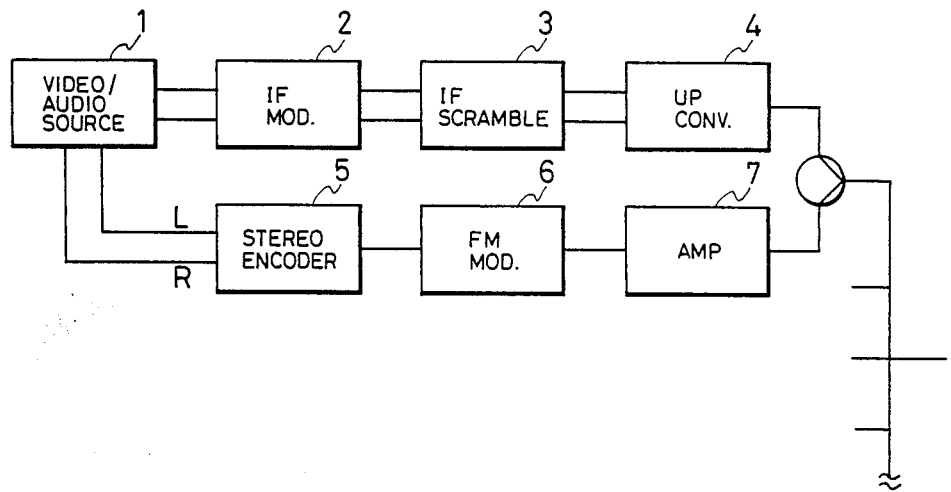
FIGS. 1 and 2 are block diagrams showing arrangements of component parts on both the CATV center and the terminal sides in an FM broadcast system in accordance with a conventional CATV system.
Figure 2:
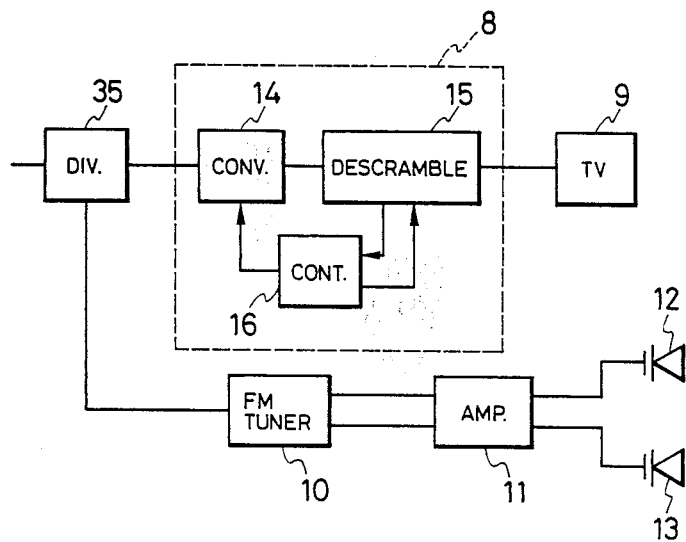

Referring to the accompanying drawings, the present invention will be described.

Like reference characters designate like component parts of the conventional apparatus and the description thereof will be omitted.

Figure 3:
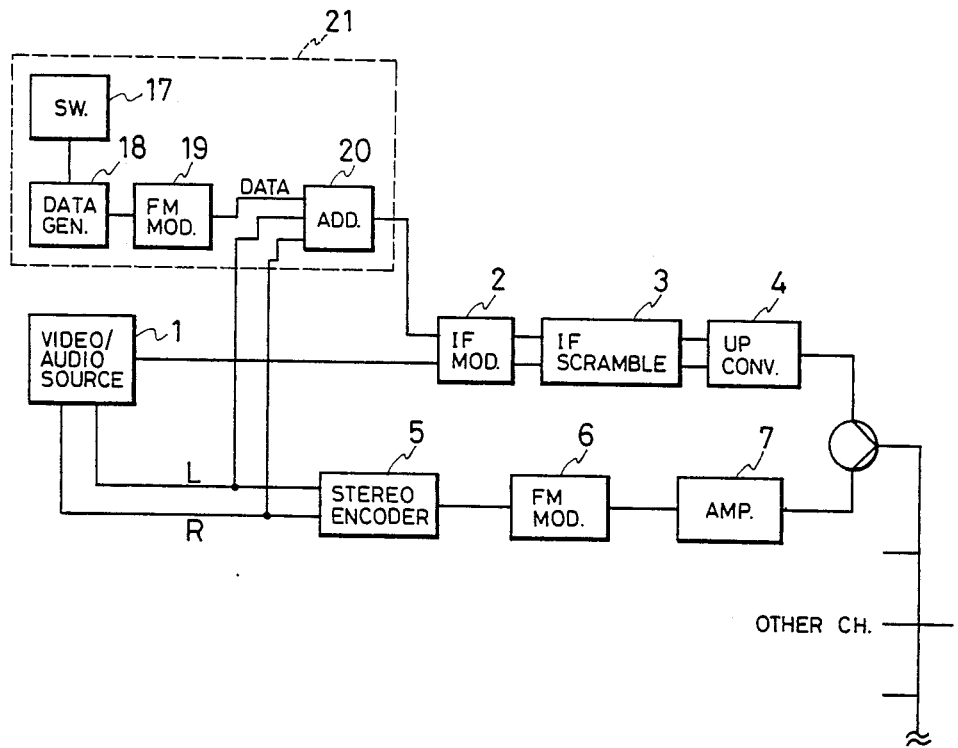
FIG. 3 is a block diagram showing an arrangement of component parts on the CATV center side according to the present invention.

FIG. 3 shows an arrangement of component parts on the CATV center side for delivering an FM stereo broadcast together with a video source. A multiple data encoder 21 comprises a channel data switch 17, a data signal generator 18 for generating data according to the channel data switch 17, and an FM data modulator 19 for subjecting the data to FM modulation, the data being supplied to an adder 20.

Figure 5:
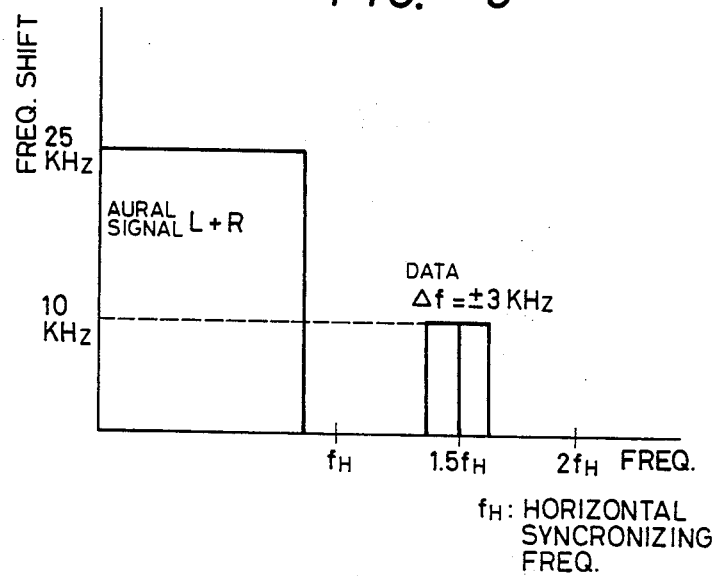
FIG. 5 is an example of a base band spectrum resulting from the superimposition of data on an audio signal on the center side.

The output of the video/audio source is supplied to the adder 20 where the video/audio source output is added to the output signal of the FM data modulator 19 and the data is consequently superimposed on the audio signal. FIG. 5 shows an example of a base band spectrum resulting from the superimposition of the data on the audio signal, wherein $f_H$ is the horizontal synchronizing frequency.

Figure 4:
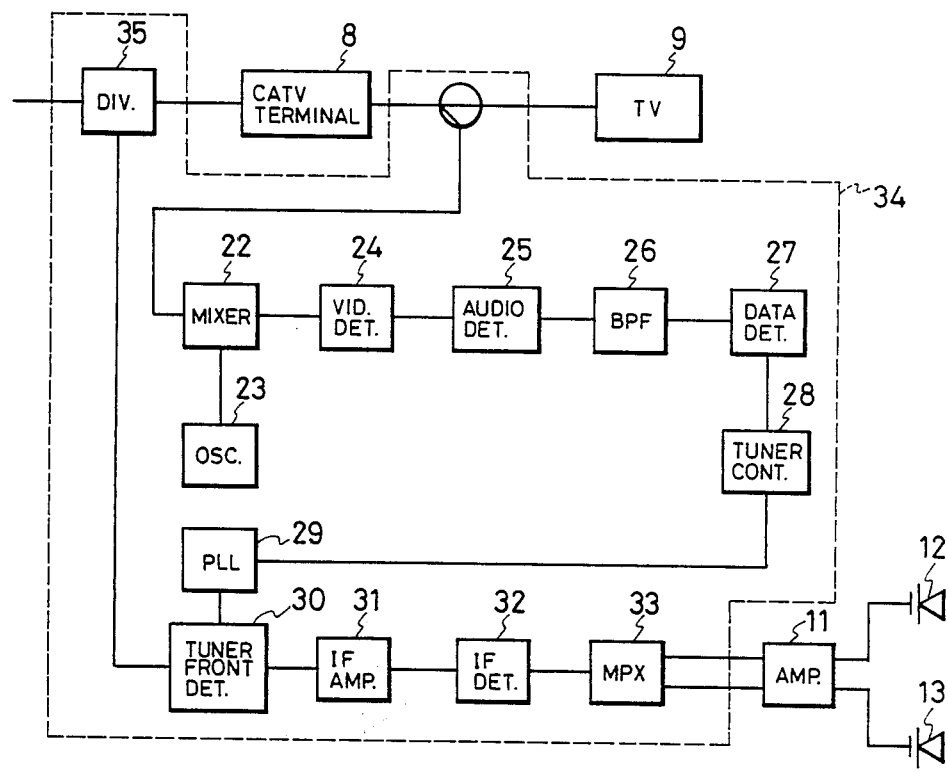
FIG. 4 is a block diagram showing an arrangement of component parts on the terminal side.

FIG. 4 shows an arrangement of component parts on the terminal side for receiving the stereo sound transmitted from the CATV center whose component parts are arranged as in FIG. 3. The output signal of the CATV terminal unit 8 is applied to a stereo receiver 34. The arrangement of component parts on the terminal side includes a mixer 22 for mixing the output signal of a local oscillator 23 with the above output signal and for converting the mixed signal into an IF video signal and an IF audio signal. The mixed output signals are transmitted from a video detector 24 to a data detector 27 through an audio detector 25 and a band pass filter 26 and an FM tuner controller 28. The FM tuner controller 28 sends PLL (phase-locked loop) data to a PLL circuit 29 and controls a voltage controlled oscillator (VCO) in an FM tuner front end 30. The output from the PLL circuit is subjected to stereo demodulation through an IF amplifier 31, an FM detector means 32 and an MPX (multiplexing) circuit 33.

The operation of the above embodiment of the present invention thus arranged will now be described in detail.

The channel data switch 17 is used to set the base frequency of the FM broadcast band for use in stereo broadcasting and the channel number incremented with a step of 200 kHz. Assuming the base frequencies are 87.5 MHz and 87.6 MHz, the two on/off states of the switch may be provided as the two base frequencies.

The frequency thus determined defines whether or not the base frequency is an odd or even multiple of 100 kHz. However, the base frequency is not restricted to the above-mentioned frequencies. Accordingly, the first frequency on the FM broadcast band suitable for a system being operated should be used as the base frequency.

Moreover, the channel number defines the frequency band incremented with a step of 200 kHz from the base frequency set as described above. By thus setting the base frequency and the channel number, the FM stereo broadcast frequency being transmitted can be set according to the following calculation.

FM broadcast frequency (MHz) = base frequency + channel number × 0.2.

Given, e.g., the base frequency of 87.6 MHz and the channel number 16 are selected, then 87.6 + 16 × 0.2 = 90.8 (MHz)

may be set as the frequency of the stereo broadcast being delivered.

The channel number is also set in accordance with the binary system and, when the channel number is "16", it can be expressed by (0 0 1 0 0 0 0). Channel numbers up to 255 can be set by displaying the on and off states of the switch with 0 and 1 in the binary system, respectively, provided that at least eight switches are installed. In other words, the data of 255 frequencies regulated by nine switches including what is used for setting the base frequency can be displayed.

The data obtained from the channel data switch 17 as a source is converted by the data signal generator into a form suitable for being sent by the CATV center for each terminal unit, i.e., a format as shown in FIGS. 6A-6C. In this example, the base frequency is transmitted in DATA 1 and DATA 2 contains the channel number. An isolation bit (for separating data from each other) is sandwiched between each block. In other words, the leading 1 bit is set at "1" when the base frequency is 87.5 MHz and "0"]when it is 87.6 MHz. Moreover, by making 8 bits correspond to the channel number expressed in the binary system, DATA 2 can be generated as data. This NRZ (non-return to zero) signal is converted into a BPS (bi-phase space) signal, which is then supplied to the FM data modulator 19 and subjected to frequency modulation, and is then added by the adder 20 to the video/audio source 1. As a result, the above data is superimposed on the audio signal portion.

FIG. 5 shows an example of the base band spectrum resulting from the superimposition of the above data on the audio signal. In this FM-FM system, there is provided an audio carrier, which is subjected to frequency modulation using the above data and frequency shifted to such a frequency as not to interfere with the decoded data superimposed on the IF audio signal of the existing IF scramble encoder 3. If the horizontal synchronizing frequency is set at $f_H$, for instance, the shifted frequency may be set as $$1.5 f_H + 3 \text{ kHz or } 1.5 f_H 3 \text{ kHz}.$$

The reason for this is that, since the scrambled data is amplitude modulated with a frequency of 2 $f_H$ before being transmitted in the existing scramble system, such a frequency and a frequency shift which does not to interfere with the existing scramble data must be set for the transmission of the data. The above frequency and the frequency shift should preferably be set because the frequency must be set as low as possible to effect the above setting without modifying the existing modulator.

As set forth above, the CATV center transmits the video signal and the data superimposed on the audio signal simultaneously with the FM stereo sound as in the conventional case through the stereo encoder 5, the FM audio modulator 6 and the multiple amplifier 7. They are mixed with the output signal obtained from the channel up converter 4 and transmitted together with other channel signals to each terminal unit.

On the terminal side, the output signal of the CATV terminal unit 8 is supplied to the stereo receiver 34 and mixed by the mixer 22 with the local oscillation frequency supplied by the local oscillator 23 and then converted into the IF video signal and the IF audio signal. These signals are first detected by the video detector 24 and the audio detector 25 and only the frequency band of the data signal superimposed on the audio signal is allowed to pass through the band pass filter 26. On the other hand, the stereo broadcast channel data superimposed on the audio signal of the TV broadcast channel, which is selected by the data detector 27, is demodulated. In other words, the base band spectrum of the signal obtained through the band pass filter 26 has such a form as shown in FIG. 5 and the spectrum is subjected to FM detection in the data detector 27. The data resulting from the detection is taken out as the BPS signal generated by the data signal generator 18 on the center side.

The data thus demodulated is supplied to the FM tuner controller 28, whereas the PLL circuit 29 transmits the PLL data based on the above data so as to control, e.g., the VCO in the FM tuner front end 30 and to tune in to the frequency corresponding to the channel H.

This system will be described in specific terms. Since the required tuning frequency is formed in the relationship of FM broadcast frequency=base frequency+-channel numbe×0.2, the tuning frequency can be demodulated by providing the FM tuner controller 28 with the operational function having the above operation conducted using the above initial frequency data and the channel number data. The tuning frequency is used to cause the operation of the PLL circuit 29 and the operation thereof is expressed by $$f = f_{FM} + 10.7 \text{ (MHz)} = f_{OFF} + Ch \times 0.2 + 10.7$$

where P=prescaler division ratio; $f_H$=reference frequency; N=division ratio of programmable divider; $f_{FM}$=FM bro frequency; $f_{OFF}$=base frequency; f=VCO frequency; and Ch=channel number.

In this case, $$N = (f_{OFF} + Ch \times 0.2 + 10.7)/(P \times f_H)$$

from the relationship $$f = P \times f_H \times N$$

Given the values of the above parameter P=1, $f_H$=100 kHz, $f_{OFF}$=87.6 MHz, Ch=16, so that N=1015.

When the division ratio N is thus determined, it becomes possible to tune into the tuning frequency by giving the division ratio N as the PLL data. The terminal unit also includes an IF amplifier 31, an FM detector 32 and an MPX circuit, wherein the tuned frequency is used for stereo demodulation.

Although the data to be superimposed according to the above embodiment has been shown in reference to the FM-FM system for subjecting the data to frequency modulation by providing the audio signal with the carrier, the data may instead be amplitude modulated to ensure the effect similar to that of the above embodiment.

Moreover, the intercarrier system has been employed to obtain the audio signal on the terminal side according to the above embodiment, the same effect will be demonstrated even though a separate carrier system is introduced.

As set forth above, the FM broadcast channel data in addition to the scramble data is added on the CATV center side and the data is demodulated and used to tune in to the FM tuner automatically on the terminal side according to the present invention, whereby the viewer is able to receive a stereo broadcast simultaneously with stereo service without manual tuning operation and simply enjoy the stereo broadcast service.

Since the stereo receiver 34 is connected to the input and outut cables of the CATV terminal unit 8 and may also additionally be connected to the existing CATV terminal unit 8, any subscriber in possession of only the CATV terminal unit is allowed to receive the stereo broadcast service by connecting only the stereo receiver 34 thereto.

What is claimed is:

1. A CATV system of the type comprising a cable, a sending side and a receiving side, said sending side comprising:
    first means for delivering a television signal in a first frequency band, said television signal comprising a video signal and a TV audio signal;
    second means for delivering an FM stereo signal, corresponding to said television signal, in a frequency channel outside said first freuqency band;
    a channel data switch for selecting data identifying the channel of the FM stereo signal corresponding to said television signal as an output and means for superimposing said output of said channel data switch on said TV audio signal.

2. A CATV system as claimed in claim 1, wherein said receiving side, comprises: means for demodulating said output of said channel data switch superimposed on said TV audio signal from said TV audio signal; an FM tuner receiving said FM stereo signal; means for tuning said FM tuner to said frequency channel according to an output of said demodulating means; and means for receiving said transmitted television signal from said cable.

3. A CATV system as recited in claim 2, wherein said first delivering means comprises an IF modulator receiving said television signal and a data signal and wherein said superimposing means comprises an FM modulator receiving said output of said channel data switch and providing said data signal.

4. A CATV system as recited in claim 3, wherein said demodulating means comprises a local oscillator, a mixer receiving said television signal and an output of said local oscillator, a video detector receiving an output of said mixer, an audio detector receiving an output of said video detector and a band pass filter receiving an output of said audio detector

* * * * *